(12) United States Patent
Terada et al.

(10) Patent No.: US 8,198,377 B2
(45) Date of Patent: Jun. 12, 2012

(54) THERMAL FLUIDITY MODIFIER FOR POWDER COATING MATERIAL, METHOD FOR PRODUCING THE SAME, AND POWDER COATING MATERIAL

(75) Inventors: Koji Terada, Toyohashi (JP); Junya Nakamura, Toyohashi (JP); Kana Akeda, Toyohashi (JP); Makoto Moriya, Pasadena, TX (US)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/668,101

(22) PCT Filed: Jul. 8, 2008

(86) PCT No.: PCT/JP2008/062321
§ 371 (c)(1),
(2), (4) Date: Jan. 7, 2010

(87) PCT Pub. No.: WO2009/008420
PCT Pub. Date: Jan. 15, 2009

(65) Prior Publication Data
US 2011/0003935 A1  Jan. 6, 2011

(30) Foreign Application Priority Data

Jul. 10, 2007 (JP) ................................. 2007-181131
Apr. 1, 2008 (JP) ................................. 2008-094968

(51) Int. Cl.
*C09D 133/04* (2006.01)
*C09D 5/03* (2006.01)
*C09D 201/00* (2006.01)

(52) U.S. Cl. ...................................... 525/330.3; 524/85

(58) Field of Classification Search .................. 524/853, 524/85; 525/330.3
See application file for complete search history.

(56) References Cited

U.S. PATENT DOCUMENTS

| 5,212,243 | A | 5/1993 | Toyoda et al. |
| 2003/0100692 | A1 | 5/2003 | Kawase et al. |
| 2003/0152709 | A1 | 8/2003 | Furusawa et al. |
| 2008/0280070 | A1* | 11/2008 | Knischka et al. ............. 427/595 |

FOREIGN PATENT DOCUMENTS

| GB | 1516510 A | * | 7/1978 |
| JP | 58087160 A | * | 5/1983 |
| JP | 4 359972 | | 12/1992 |
| JP | 7 179789 | | 7/1995 |
| JP | 2000 355676 | | 12/2000 |
| JP | 2001 131462 | | 5/2001 |
| JP | 2002 348527 | | 12/2002 |
| JP | 2003 82273 | | 3/2003 |
| JP | 2005138541 A | * | 6/2005 |
| WO | WO 2005/059048 | | 6/2005 |
| WO | WO 2005059048 A1 | * | 6/2005 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

Disclosed are a thermal fluidity modifier for a powder coating material, which contains a polymer containing t-butyl(meth) acrylate units and having a glass transition temperature (Tg) of 20 to 120° C. as calculated by the following equation (1):

$$1/Tg = \Sigma(w_i/Tg_i) \quad (1),$$

wherein $w_i$ represents a mass fraction of monomer i which constitutes the polymer and $Tg_i$ represents a glass transition temperature of a homopolymer of the monomer i; and a powder coating material containing the thermal fluidity modifier.

12 Claims, No Drawings

THERMAL FLUIDITY MODIFIER FOR POWDER COATING MATERIAL, METHOD FOR PRODUCING THE SAME, AND POWDER COATING MATERIAL

TECHNICAL FIELD

The present invention relates to a thermal fluidity modifier for a powder coating material, a method for producing the same, and a powder coating material.

The present application claims the priority of Japanese Patent Application No. 2007-181,131 filed on Jul. 10, 2007 and Japanese Patent Application No. 2008-094,968 filed on Apr. 1, 2008, the contents of which are incorporated herein by reference.

BACKGROUND ART

In recent years, in the field of coating materials, replacement of conventional solvent-borne coating materials in which pigments and polymer materials are dispersed in organic solvents with powder coating materials in which organic solvents are not used has been advanced, caused by enhancement of consciousness of environmental problems.

Generally, a powder coating material contains a thermal fluidity modifier for a powder coating material (hereinafter referred to as a thermal fluidity modifier), which improves the thermal fluidity of the powder coating material at the time of thermal curing, for improvement of the appearance of the resulting coat. The thermal fluidity of the powder coating material at the time of thermal curing can be improved by reduction of the melt viscosity of the powder coating material. Therefore, a low glass transition temperature-acrylic polymer which has a low glass transition temperature and is liquid at room temperature is usually used as the thermal fluidity modifier.

The thermal fluidity modifier being widely used today is one in which such a low glass transition temperature-acrylic polymer is formed into a powder by being adsorbed on fine silica particles to improve the handleability and anti-blocking property of the powder coating material.

However, there are problems such that transparency, gloss, and hardness of the resulting coating film are deteriorated when the thermal fluidity modifier adsorbed on silica particles is used for the powder coating material. Moreover, the thermal fluidity modifier including the low glass transition temperature-acrylic polymer is not necessarily satisfactory in handleability and anti-blocking property even when the low glass transition temperature-acrylic polymer is adsorbed on silica particles, because the silica particles easily causes blocking when they are left alone and are aggregated.

In addition, when a powder coating material is used, cleaning of devices and machines in a production step, such as kneading, pulverizing, and classifying, and in a coating step, is not easy. Moreover, there is a case where defects in a coating film such as generation of crawling and deterioration of leveling property and of gloss may occur even when a powder coating material is mixed with only a small amount of another powder coating material having a different thermal fluidity modifier. In other words, there is a drawback in that it is very difficult to change the properties, such as the color, of the powder coating material.

Consequently, in selecting a powder coating material, compatibility with the presently most widely used powder coating material, in which the thermal fluidity modifier including the low glass transition temperature-acrylic polymer is contained, is sometimes required.

To solve the above-mentioned problems, there is disclosed, in Patent Document 1, a powder coating material in which a surface modifier having a specific solubility parameter and a specific number average molecular weight is contained, so that the anti-blocking property of the powder coating material and the transparency and flatness of the resulting coating film are improved.

In addition, in Patent Document 2, there is disclosed a powder coating material in which a thermal fluidity modifier having a specific solubility parameter and being solid at 20° C. is contained, so that anti-blocking properties of the powder coating material and appearance of the resulting coating film are improved.

Further, in Patent Document 3, there is disclosed a thermal fluidity modifier including a polymer having isobornyl methacrylate units, a homopolymer of isobornyl methacrylate having a high glass transition temperature, and improvements in appearance of the resulting coating film and in adhesion of the resulting coating film with a finish coating material are designed.

Patent Document 1: Japanese Patent Application Laid-Open No. Hei 7-179,789
Patent Document 2: Japanese Patent Application Laid-Open No. 2000-355,676
Patent Document 3: Japanese Patent Application Laid-Open No. 2001-131,462

DISCLOSURE OF INVENTION

Problem to be Solved by the Invention

However, the surface modifier described in Patent Document 1 is a copolymer of ethyl acrylate (a homopolymer of which having a glass transition temperature of −22° C.) and n-butyl acrylate (a homopolymer of which having a glass transition temperature of −49° C.), and the handleability of the surface modifier and the anti-blocking property of the resulting powder coating material under severer conditions are insufficient.

In addition, as for the thermal fluidity modifiers described in Patent Documents 2 and 3, the thermal fluidity of the resulting powder coating materials and appearance of the resulting coating films are insufficient.

The present invention has been made in view of the above-mentioned circumstances and objects of the present invention are to provide a thermal fluidity modifier which can improve anti-blocking property and thermal fluidity at the time of thermal curing of the resulting powder coating material and can form a cured coating film excellent in appearance and gloss, to provide a method for producing the same, and to provide a powder coating material containing the thermal fluidity modifier.

Means for Solving the Problem

The thermal fluidity modifier of the present invention is a polymer containing t-butyl (meth)acrylate units, wherein a glass transition temperature (Tg) of the polymer as calculated by the following equation (1) is 20 to 120° C.:

$$1/Tg = \Sigma(w_i/Tg_i) \qquad (1),$$

wherein $w_i$ represents a mass fraction of monomer i which constitutes the polymer and $Tg_i$ represents a glass transition temperature of a homopolymer of the monomer i.

In addition, it is preferable that a solubility parameter (δ) of the polymer as calculated by the following equation (2) be 18.50 to 19.00 $(J/cm^3)^{1/2}$, $$\delta = \Sigma(m_i \delta_i) \quad (2),$$

wherein $m_i$ represents a mole fraction of the monomer i which constitutes the polymer and $\delta_i$ represents a solubility parameter of the monomer i.

In addition, it is preferable that a mass average molecular weight (Mw) of the thermal fluidity modifier be 5,000 to 50,000, and the powder coating material of the present invention contain any of the above-mentioned thermal fluidity modifiers.

Further, it is preferable that a method for producing the thermal fluidity modifier include dispersing a monomer containing at least t-butyl(meth)acrylate units in an aqueous medium, and polymerizing the monomer.

Effect of the Invention

According to the thermal fluidity modifier and the powder coating material containing the thermal fluidity modifier of the present invention, the anti-blocking property and the thermal fluidity at the time of thermal curing of the powder coating material can be improved, and thus a cured coating film excellent in appearance and gloss can be formed.

BEST MODE FOR CARRYING OUT THE INVENTION

Hereinafter, the present invention will be explained in more detail.

{Thermal Fluidity Modifier}

The thermal fluidity modifier of the present invention is a polymer containing t-butyl (meth)acrylate units. A thermal fluidity modifier excellent in thermal fluidity at the time of thermal curing can be obtained by formulating t-butyl(meth)acrylate units. In addition, a powder coating material containing the thermal fluidity modifier is excellent in appearance and gloss of the resulting coating film and in compatibility with a powder coating material containing a thermal fluidity modifier including a low glass transition temperature-acrylic polymer for general-purposes. It is preferable for the thermal fluidity modifier to contain, in particular, t-butyl methacrylate units, by which the anti-blocking property of the thermal fluidity modifier and a powder coating material containing the thermal fluidity modifier and hardness of the resulting coating film tend to be improved.

Note that "(meth)acrylate" means "acrylate and/or methacrylate".

The thermal fluidity modifier of the present invention can contain units of another monomer other than t-butyl(meth)acrylate units as a constituting component, if necessary.

Examples of units of the other monomer include units of a (meth)acrylate monomer such as methyl(meth)acrylate, ethyl (meth)acrylate, n-butyl(meth)acrylate, i-butyl (meth)acrylate, 2-ethylhexyl(meth)acrylate, n-lauryl(meth)acrylate, n-stearyl (meth)acrylate, cyclohexyl(meth)acrylate, phenyl (meth)acrylate, benzyl(meth)acrylate, isobornyl(meth)acrylate, 2-methoxyethyl(meth)acrylate, 2-ethoxyethyl(meth) acrylate, and phenoxyethyl(meth)acrylate; a hydroxyl group-containing (meth)acrylate monomer such as 2-hydroxyethyl (meth)acrylate, 2-hydroxypropyl(meth)acrylate, 4-hydroxybutyl(meth)acrylate, and glycerol (meth)acrylate; a carboxyl group-containing vinyl monomer such as (meth) acrylic acid, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumalic acid, maleic acid, itaconic acid, monomethyl maleate, and monomethyl itaconate; an acid anhydride-containing vinyl monomer such as maleic anhydride and itaconic anhydride; an epoxy group-containing vinyl monomer such as glycidyl(meth)acrylate, glycidyl α-ethyl acrylate, and 3,4-epoxybutyl(meth)acrylate; an amino group-containing (meth)acrylate monomer such as dimethylaminoethyl(meth)acrylate and diethylaminoethyl (meth)acrylate; an amide group-containing monomer such as (meth)acrylamide, N-t-butyl(meth)acrylamide, N-methylol (meth)acrylamide, N-methoxymethyl(meth)acrylamide, N-butoxymethyl(meth)acrylamide, diacetone acrylamide, maleic amide, and maleimide; a vinyl monomer such as styrene, α-methyl styrene, vinyl toluene, (meth)acrylonitrile, vinyl chloride, vinyl acetate, and vinyl propionate; and a polyfunctional monomer such as divinylbenzene, ethylene glycol di(meth)acrylate, 1,3-butylene glycol di(meth)acrylate, 1,6-hexanediol di(meth)acrylate, triethylene glycol di(meth)acrylate, tetraethylene glycol di(meth)acrylate, tripropylene glycol di(meth)acrylate, trimethylolpropane tri (meth)acrylate, allyl(meth)acrylate, and N,N'-methylenebis (meth)acrylamide. These monomers can be used alone or in a combination of two or more kinds thereof.

Among them, i-butyl(meth)acrylate and 2-ethylhexyl (meth)acrylate are particularly preferable, by which the thermal fluidity of the resulting powder coating material at the time of thermal curing and the compatibility of the resulting powder coating material with a powder coating material containing a thermal fluidity modifier including a low glass transition temperature-acrylic polymer for general-purposes tend to be improved.

Note that "(meth)acrylate" means "acrylate and/or methacrylate", "(meth)acrylonitrile" means "acrylonitrile and/or methacrylonitrile", "(meth)acrylamide" means "acrylamide and/or methacrylamide", and "(meth)acryloyl" means "acryloyl and/or methacryloyl", respectively.

Although the amount of respective monomer units that constitute the thermal fluidity modifier of the present invention is not critical, the amount of t-butyl(meth)acrylate units is preferably in the range of from 5 to 100 parts by mass and the amount of units of the other monomer is preferably in the range of from 0 to 95 parts by mass, in 100 parts by mass of the total monomer units, based on a monomer charge composition. In addition, the amount of t-butyl(meth)acrylate units is more preferably in the range of from 15 to 90 parts by mass and the amount of units of the other monomer is more preferably in the range of from 10 to 85 parts by mass, in 100 parts by mass of the total monomer units, based on a monomer charge composition. Further, the amount of t-butyl(meth) acrylate units is particularly preferably in the range of from 55 to 75 parts by mass and the amount of units of the other monomer is particularly preferably in the range of from 25 to 45 parts by mass, in 100 parts by mass of the total monomer units, based on a monomer charge composition.

When the amount of t-butyl(meth)acrylate units is 5 parts by mass or more, thermal fluidity at the time of thermal curing of the resulting powder coating material and the appearance and gloss of the resulting coating film tend to be improved. In addition, when the amount of t-butyl(meth)acrylate units is 90 parts by mass or less, the compatibility of the resulting powder coating material with a powder coating material containing a thermal fluidity modifier including a low glass transition temperature-acrylic polymer for general-purposes tends to be improved.

In addition, when the amount of units of the other monomer is 10 parts by mass or more, the compatibility of the resulting powder coating material with a powder coating material containing a thermal fluidity modifier including a low glass transition temperature-acrylic polymer for general-purposes tends to be improved. In addition, when the amount of units of the other monomer is 95 parts by mass or less, the thermal fluidity at the time of thermal curing of the resulting powder coating material and the appearance and gloss of the resulting coating film tend to be improved.

The glass transition temperature (Tg) of the thermal fluidity modifier of the present invention is in the range of from 20 to 120° C. Further, the glass transition temperature is preferably in the range of from 30 to 110° C., more preferably in the range of from 30 to 90° C., and particularly preferably in the range of from 40 to 85° C.

When the glass transition temperature of the thermal fluidity modifier is 20° C. or higher, the anti-blocking property of the thermal fluidity modifier and a powder coating material containing the thermal fluidity modifier and the hardness of the resulting coating film tend to be improved. In addition, when the glass transition temperature of the thermal fluidity modifier is 120° C. or lower, the thermal fluidity of the resulting powder coating material at the time of thermal curing, the appearance and gloss of the resulting coating film, and the compatibility of the resulting powder coating material with a powder coating material containing a thermal fluidity modifier including a low glass transition temperature-acrylic polymer for general-purposes tend to be improved.

Note that the glass transition temperature (Tg) of the thermal fluidity modifier of the present invention is the value calculated by the following equation (1) in absolute temperature (K) and converted to Celsius (° C.):

$$1/Tg = \Sigma(w_i/Tg_i) \qquad (1),$$

wherein $w_i$ represents a mass fraction of monomer i which constitutes the polymer, $Tg_i$ represents a glass transition temperature of a homopolymer of the monomer i, and Tg and $Tg_i$ are expressed in absolute temperature (K). In addition, $Tg_i$ is the value described in "Polymer Handbook, Fourth Edition, John Wiley & Sons Inc. J. Brandrup, VI/p, 193-253".

The solubility parameter ($\delta$) of the thermal fluidity modifier of the present invention is preferably in the range of from 18.50 to 19.00 $(J/cm^3)^{1/2}$, more preferably in the range of from 18.55 to 18.90 $(J/cm^3)^{1/2}$, and particularly preferably in the range of from 18.55 to 18.80 $(J/cm^3)^{1/2}$.

When the solubility parameter of the thermal fluidity modifier is 18.50 $(J/cm^3)^{1/2}$ or higher, adhesion of the resulting coating film with a material to be coated tends to be improved. In addition, when the solubility parameter is 19.00 $(J/cm^3)^{1/2}$ or lower, the appearance of the resulting coating film, the compatibility of the resulting powder coating material with a powder coating material containing a thermal fluidity modifier including a low glass transition temperature-acrylic polymer for general-purposes, and the gloss of the coating film to be obtained under the condition of low temperature curing tend to be improved.

The solubility parameter ($\delta$) of the thermal fluidity modifier of the present invention can be obtained by a conventional method described in Polymer Engineering and Science (Polym. Eng. Sci.), 14 (2), 147, 472 (1974), written by R. F. Fedors, and it is a value calculated by the following equation (2):

$$\delta = \Sigma(m_i \delta_i) \qquad (2),$$

wherein $m_i$ represents a mole fraction of the monomer i which constitutes the polymer and $\delta_i$ represents a solubility parameter of the monomer i.

Note that the solubility parameter ($\delta_i$) of the monomer i can be calculated by the following equation (3):

$$\delta_i = \{\Sigma(n_j E_j)/\Sigma(n_j V_j)\}^{1/2} \qquad (3),$$

wherein $n_j$ represents a number of atomic group j which constitutes the monomer i, $E_E$ represents cohesive energy (J/mol) of the atomic group j, and $V_j$ represents molar volume ($cm^3$/mol) of the atomic group j. Note that $E_E$ and $V_j$ are the values described in the above non-patent document.

The mass average molecular weight (Mw) of the thermal fluidity modifier of the present invention is preferably in the range of from 5,000 to 50,000, more preferably in the range of from 6,000 to 35,000, and particularly preferably in the range of from 6,000 to 15,000.

When the mass average molecular weight of the thermal fluidity modifier is 5,000 or larger, the anti-blocking property of the thermal fluidity modifier and a powder coating material containing the thermal fluidity modifier, and the water resistance and solvent resistance of the resulting coating film tend to be improved. In addition, when the mass average molecular weight of the thermal fluidity modifier is 50,000 or smaller, the appearance and gloss of the resulting coating film, and the compatibility of the resulting powder coating material with a powder coating material containing a thermal fluidity modifier including a low glass transition temperature-acrylic polymer for general-purposes tend to be improved.

Although the mass average molecular weight versus number average molecular weight (Mw/Mn) of the thermal fluidity modifier of the present invention is not critical, it is preferably 4 or less and more preferably 3 or less. When the Mw/Mn of the thermal fluidity modifier is 4 or less, the appearance of the resulting coating film tends to be improved.

<Method for Producing the Thermal Fluidity Modifier>

Examples of the method for producing the thermal fluidity modifier include conventional polymerization methods such as suspension polymerization, bulk polymerization, solution polymerization, and emulsion polymerization. Among them, the suspension polymerization is particularly preferable, in which solid particles can be easily obtained by simply carrying out filtration, washing, dehydration, and drying, after the polymerization.

As the specific method for producing the thermal fluidity modifier of the present invention by the suspension polymerization method, for example, a method of adding the monomer mixture containing at least t-butyl(meth)acrylate, a dispersing agent, a polymerization initiator, and a chain transfer agent into an aqueous medium to make dispersion thereof, heating the resulting dispersion for polymerization of the monomer, and filtrating the dispersion after the polymerization followed by washing, dehydrating, and drying the filter cake to produce the thermal fluidity modifier can be mentioned.

(Dispersing Agent)

Examples of the dispersing agent to be used for producing the thermal fluidity modifier by the suspension polymerization method include an alkali metal salt of poly(meth)acrylic acid, a copolymer of an alkali metal salt of (meth)acrylic acid with an ester of (meth)acrylic acid, a copolymer of an alkali metal salt of sulfoalkyl (meth)acrylate with an ester of (meth) acrylic acid, an alkali metal salt of polystyrene sulfonate, a copolymer of an alkali metal salt of styrene sulfonic acid with an ester of (meth)acrylic acid, or a copolymer constituted of a combination of these monomers, or polyvinyl alcohol having a saponification rate of 70 to 100%, or methyl cellulose. These compounds can be used alone or in a combination of two or more kinds thereof.

Among them, the copolymer of an alkali metal salt of sulfoalkyl(meth)acrylate with an ester of (meth)acrylic acid is preferable, which has good dispersion stability during suspension polymerization.

Although the amount of the dispersing agent to be used is not critical, it is preferably in the range of from 0.005 to 5 parts by mass and more preferably in the range of from 0.01 to 2 parts by mass relative to 100 parts by mass of the monomer mixture.

When the amount of the dispersing agent is 0.005 part by mass or more, dispersion stability during suspension polymerization tends to be improved. In addition, when the amount of the dispersing agent is 5 parts by mass or less, the easiness of washing, the dehydration and drying property of the resulting polymer, and the water resistance of the resulting coating film tend to be improved.

In addition, it is possible to jointly use an inorganic electrolyte with a view to improving dispersion stability during suspension polymerization in the case of producing the thermal fluidity modifier by the suspension polymerization method. Examples of the inorganic electrolyte include sodium carbonate, potassium carbonate, sodium bicarbonate, sodium sulfate, and manganese sulfate. These compounds can be used alone or in a combination of two or more kinds thereof.

(Polymerization Initiator)

Examples of the polymerization initiator to be used for producing the thermal fluidity modifier of the present invention include an azo compound such as 2,2'-azobisisobutylonitrile, 2,2'-azobis(2-methylbutylonitrile), 2,2'-azobis(2,4-dimethylvaleronitrile), dimethyl-2,2'-azobisisobutylate, and 2,2'-azobis(2-methylpropionamidine)dihydrochloride; an organic peroxide such as lauroyl peroxide, stearoyl peroxide, benzoyl peroxide, bis(4-t-butylcyclohexyl) peroxydicarbonate, 1,1,3,3-tetramethylbutylperoxy-2-ethylhexanoate, t-hexylperoxy-2-ethylhexanoate, t-butylperoxy-2-ethylhexanoate, t-hexyl peroxy isopropyl monocarbonate, t-butyl peroxy isopropyl monocarbonate, diisopropylbenzene hydroperoxide, cumene hydroperoxide, t-butyl hydroperoxide, and t-hexyl hydroperoxide; and an inorganic peroxide such as hydrogen peroxide, potassium persulfate, sodium persulfate, and ammonium persulfate. These compounds can be used alone or in a combination of two or more kinds thereof.

Although the amount of the polymerization initiator to be used is not critical, it is preferably in the range of from 0.05 to 10 parts by mass and more preferably in the range of from 0.1 to 5 parts by mass relative to 100 parts by mass of the monomer mixture.

When the amount of the polymerization initiator is 0.05 part by mass or more, the polymerization proceeds in a relatively short time and the productivity tends to be improved. In addition, when the amount of the polymerization initiator is 10 parts by mass or less, the heat of polymerization is alleviated and control of the polymerization temperature tends to become easy.

(Chain Transfer Agent)

When the thermal fluidity modifier of the present invention is produced, a chain transfer agent can be used for adjustment of the molecular weight. Examples of the chain transfer agent include alkyl mercaptans such as n-butyl mercaptan, sec-butyl mercaptan, n-octyl mercaptan, n-dodecyl mercaptan, t-dodecyl mercaptan, and n-octadecyl mercaptan; thioglycolate esters such as 2-ethylhexyl thioglycolate, methoxybutyl thioglycolate, and trimethylolpropane tris(thioglycolate); mercaptopropionate esters such as 2-ethylhexyl β-mercaptopropionate, 3-methoxybutyl β-mercaptopropionate, and trimethylolpropane tris(β-thiopropionate); and α-methylstyrene dimmer and terpinolene. These compounds can be used alone or in a combination of two or more kinds thereof.

Although the amount of the chain transfer agent to be used is not critical, it is preferably in the range of from 0.05 to 10 parts by mass and more preferably in the range of from 0.1 to 5 parts by mass relative to 100 parts by mass of the monomer mixture.

When the amount of the chain transfer agent is 0.05 part by mass or more, the thermal fluidity at the time of thermal curing, and the appearance and gloss of the resulting coating film tend to be improved. In addition, when the amount of the chain transfer agent is 10 parts by mass or less, water resistance and solvent resistance of the resulting coating film tend to be improved.

(Polymerization Temperature)

Although the polymerization temperature at the time of production of the thermal fluidity modifier of the present invention is not critical, it is preferably in the range of from 30 to 150° C. and more preferably in the range of from 50 to 130° C.

When the polymerization temperature is 30° C. or higher, the polymerization proceeds in a relatively short time and the productivity tends to be improved. In addition, when the polymerization temperature is 150° C. or lower, the heat of polymerization is reduced and control of the polymerization temperature tends to become easy.

As mentioned above, it is possible to make the glass transition temperature of the thermal fluidity modifier fall within the range of from 20 to 120° C. and to make the solubility parameter of the thermal fluidity modifier fall within the range of from 18.50 to 19.00 $(J/cm^3)^{1/2}$ by adjusting the kind and amount of respective monomer units constituting the thermal fluidity modifier and it is possible to make the mass average molecular weight of the thermal fluidity modifier fall within the range of from 5,000 to 50,000 by properly selecting and adjusting the polymerization temperature, polymerization initiator, chain transfer agent, or the like.

<Powder Coating Material>

The powder coating material of the present invention is not particularly limited as long as it contains the thermal fluidity modifier of the present invention, and a conventional binder resin and a curing agent can be used as constituents thereof.

(Binder Resin)

Examples of the binder resin to be used in the present invention include a polyester resin, epoxy resin, epoxy-polyester resin, acrylic resin, acrylic-polyester resin, phenol resin, urea resin, and melamine resin. Among them, a polyester resin, an epoxy resin, an epoxy-polyester resin, and an acrylic resin are preferable, which have good coating film appearance and good coating film properties.

As the polyester resin, for example, the one having a mass average molecular weight in the range of from 1,000 to 50,000 and a softening temperature in the range of 50 to 150° C. is preferably used. When the mass average molecular weight is 1,000 or more, the weather resistance and chemical resistance of the resulting powder coating material tend to be improved, and when it is 50,000 or less, the pulverizing property and coating film appearance tend to be improved. When the softening temperature is 50° C. or higher, the pulverizing property and coating film hardness tend to be improved, and when it is 150° C. or lower, the coating film appearance and low temperature curability tend to be improved.

As the epoxy resin, for example, the one having two or more epoxy groups in a molecule and having a mass average molecular weight in the range of from 1,000 to 50,000, an epoxy equivalent in the range of from 500 to 2,000, and a softening temperature in the range of 50 to 150° C. is preferably used. When the mass average molecular weight is 1,000 or more, the weather resistance and chemical resistance tend to be improved, and when it is 50,000 or less, the pulverizing property and the coating film appearance tend to be improved. When the epoxy equivalent is 500 or more, the coating film appearance tends to be improved, and when it is 2,000 or less, the coating film hardness, the weather resistance, and the chemical resistance tend to be improved. When the softening temperature is 50° C. or higher, the pulverizing property and the coating film hardness tend to be improved, and when it is 150° C. or lower, the coating film appearance and low temperature curability tend to be improved.

As the acrylic resin, for example, the one having two or more epoxy groups in a molecule and having a mass average molecular weight in the range of from 1,000 to 50,000, an epoxy equivalent in the range of from 150 to 3,000, and a softening temperature in the range of 50 to 150° C. is preferably used. When the mass average molecular weight is 1,000 or more, the weather resistance and chemical resistance tend to be improved, and when it is 50,000 or less, the pulverizing property and the coating film appearance tend to be improved. When the epoxy equivalent is 150 or more, the coating film appearance tends to be improved, and when it is 3,000 or less, the coating film hardness, the weather resistance, and the chemical resistance tend to be improved. When the softening temperature is 50° C. or higher, the pulverizing property and coating film hardness tend to be improved, and when it is 150° C. or lower, the coating film appearance and low temperature curability tend to be improved. The acrylic resin is not particularly limited as long as it contains epoxy group-containing vinyl monomer units, and as the epoxy group-containing vinyl monomer, the same one as the aforementioned epoxy group-containing vinyl monomer which can be used in the thermal fluidity modifier of the present invention can be used.

Although the amount of the binder resin to be used in the powder coating material of the present invention is not critical, it is preferably in the range of from 45 to 98 parts by mass, more preferably in the range of from 67 to 97 parts by mass, and particularly preferably in the range of from 78 to 96 parts by mass in 100 parts by mass of the total of the thermal fluidity modifier, the binder resin, and the curing agent.

When the amount of the binder resin to be used is 45 parts by mass or more, the appearance and gloss of the resulting coating film tend to be improved. In addition, when the amount of the binder resin to be used is 98 parts by mass or less, the hardness, water resistance, and solvent resistance of the resulting coating film tend to be improved.

(Curing Agent)

In the case where a polyester resin having two or more carboxyl groups in a molecule is used as the binder resin, 1,3,5-triglycidyl isocyanurate (TGIC) and β-hydroxyalkylamides can be properly used as the curing agent. In addition, it is possible to use an epoxy resin or an acrylic resin, each having two or more epoxy groups in a molecule, as the curing agent to thereby provide an epoxy-polyester resin or an acrylic-polyester resin. Further, in the case where a polyester resin having two or more hydroxyl groups in a molecule is used as the binder resin, an isocyanate compound such as hexamethylene diisocyanate, xylylene diisocyanate, or isophorone diisocyanate; or a block isocyanate compound in which an isocyanate group is blocked by a blocking agent such as methanol, isopropanol, or ε-caprolactam can be used as the curing agent. These compounds can be used alone or in a combination of two or more kinds thereof.

In the case where an epoxy resin is used as the binder resin, any curing agent having reactivity with the binder resin can be used, and examples thereof include multivalent carboxylic acids such as adipic acid, sebacic acid, dodecanedioic acid, trimellitic acid, succinic acid, isophthalic acid, terephthalic acid, orthophthalic acid, tetrahydrophthalic acid, and hexahydrophthalic acid; acid anhydrides such as trimellitic anhydride, succinic anhydride, phthalic anhydride, and tetrahydrophthalic anhydride; hydrazide compounds such as adipic dihydrazide, sebacic dihydrazide, dodecanedioic dihydrazide, and isophthalic dihydrazide; and amine compounds such as ethylenediamine, diethylenetriamine, triethylenetetramine, m-xylylenediamine, m-phenylenediamine, and p-phenylenediamine. These compounds can be used alone or in a combination of two or more kinds thereof. In addition, it is possible to use a polyester resin having two or more carboxylic groups in a molecule as the curing agent to thereby provide an epoxy-polyester resin.

In the case where an acrylic resin is used as the binder resin, any curing agent having reactivity with the binder resin can be used, and examples thereof include multivalent carboxylic acids such as adipic acid, sebacic acid, dodecanedioic acid, trimellitic acid, succinic acid, isophthalic acid, terephthalic acid, orthophthalic acid, tetrahydrophthalic acid, and hexahydrophthalic acid; and acid anhydrides such as trimellitic anhydride, succinic anhydride, phthalic anhydride, and tetrahydrophthalic anhydride. These compounds can be used alone or in a combination of two or more kinds thereof. In addition, it is possible to use a polyester resin having two or more carboxylic groups in a molecule as the curing agent to thereby provide an acrylic-polyester resin.

Although the amount of the curing agent to be used in the powder coating material of the present invention is not critical, it is preferably in the range of from 1 to 50 parts by mass, more preferably in the range of from 2 to 30 parts by mass, and furthermore preferably in the range of from 3 to 20 parts by mass in 100 parts by mass of the total of the thermal fluidity modifier, binder resin, and curing agent.

When the amount of the curing agent to be used is 1 part by mass or more, hardness, water resistance, and solvent resistance of the resulting coating film tend to be improved. In addition, when the amount of the curing agent to be used is 50 parts by mass or less, the thermal fluidity at the time of thermal curing of the resulting powder coating material, and the appearance and gloss of the resulting coating film tend to be improved.

(Thermal Fluidity Modifier)

Although the amount of the thermal fluidity modifier to be used in the powder coating material of the present invention is not critical, it is preferably in the range of from 0.1 to 5 parts by mass, more preferably in the range of from 0.3 to 3 parts by mass, and particularly preferably in the range of from 0.5 to 2 parts by mass in 100 parts by mass of the total of the binder resin, curing agent, and thermal fluidity modifier.

When the amount of the thermal fluidity modifier to be used is 0.1 part by mass or more, the thermal fluidity at the time of thermal curing of the resulting powder coating material, and the appearance and gloss of the resulting coating film tend to be improved. In addition, when the amount of the thermal fluidity modifier to be used is 5 parts by mass or less, the hardness, water resistance, and solvent resistance of the resulting coating film tend to be improved.

The powder coating material of the present invention can contain, if necessary, various additives like a pigment such as titanium oxide, an anti-foaming agent such as benzoin, a curing accelerator such as triphenylphosphine, an antioxidant, an ultraviolet absorber, a radical scavenger, a slip agent, a filler, a crawling inhibitor, and an anti-sagging agent besides the thermal fluidity modifier, binder resin, and curing agent.

<Method for Producing a Powder Coating Material>

The method for producing a powder coating material of the present invention is exemplified by a method of dry-mixing the thermal fluidity modifier, binder resin, curing agent, and various optional additives to be used if necessary, melt-kneading the resulting mixture at a softening temperature of the binder resin or higher, specifically at 50 to 150° C., and more preferably at 60 to 130° C., pulverizing the resulting kneaded matter, and classifying the resulting pulverized material.

Examples of the dry-mixing apparatus include various mixers such as Henshell mixer, Banbury mixer, a high speed mixer, and Nauter mixer.

Examples of the melt kneading apparatus include a heating roll, heating kneader, and extruder. In the case where the temperature of the apparatus is 50° C. or higher at the time of melt kneading, the homogeneous mixing of the thermal fluidity modifier, binder resin, curing agent, and various optional additives to be used if necessary can become easy and productivity of the resulting powder coating material tends to be improved, and when it is 150° C. or lower, curing reaction during melt kneading is suppressed, and thus the coating film performance such as appearance or gloss tends to be improved.

Examples of the pulverizing apparatus include a hammer mill, pin mill, and jet mill.

An example of the classification apparatus is a vibrating screen.

Although the mass average particle diameter of the powder coating material of the present invention is not particularly limited, it is preferably in the range of from 5 to 100 μm and more preferably in the range of from 10 to 80 μm.

When the mass average particle diameter is 5 μm or larger, the productivity and handleability of the powder coating material tend to be improved and at the same time the risk of a dust explosion tends to be reduced. In addition, when the mass average particle diameter is 100 μm or smaller, the appearance of the resulting coating film tends to be improved.

The method for forming a coating film of the powder coating material of the present invention is exemplified by a method of coating the powder coating material on a material to be coated by a conventional method such as an electrostatic coating method or a fluidized bed coating method, and heating the resulting coated material at the temperature of the melting point of the binder resin or higher, specifically at 100 to 280° C. and more preferably at 130 to 240° C. to cure the powder coating material and thus to form a coating film.

When the temperature for forming the coating film is 100° C. or higher, the flatness, gloss, and hardness of the coating film tend to be improved. In addition, when the temperature for forming the coating film is 280° C. or lower, the thermal decomposition property of the components of the coating film is suppressed and hence the defects of the coating film such as pinholes and bubbles tend to be reduced.

In addition, examples of the material to be coated include metals such as iron, zinc, tin, stainless steel, copper, and aluminum; inorganic materials such as glass; and those which are subjected to surface treatment thereon such as blasting treatment, iron phosphate treatment, and zinc phosphate treatment, or subjected to primer or intermediate coating thereon.

Although the thickness of the coating is not critical, it is preferably in the range of from 10 to 1,000 μm and more preferably in the range of from 20 to 300 μm.

When the thickness of the coating is 10 μm or more, the flatness, gloss, and adhesion of the coating film tend to be improved, and when the thickness of the coating is 1,000 μm or less, the defects of the coating film such as pinholes and bubbles tend to be reduced.

EXAMPLES

Hereinafter, the present invention will be explained in more detail with Examples. However, the present invention is not limited to the Examples. Note that in the description below, "part" means "part by mass".

In addition, measurements of physical properties and evaluations in Examples and Comparative Examples were carried out according to the following methods.

(1) Glass Transition Temperature (Tg)

The glass transition temperature was calculated using the following equation (1):

$$1/Tg = \Sigma(w_i/Tg_i) \quad (1),$$

wherein $w_i$ represents a mass fraction of monomer i which constitutes the polymer and $Tg_i$ represents a glass transition temperature of a homopolymer of the monomer i.

(2) Solubility Parameter (δ)

The solubility parameter was calculated using the following equation (2):

$$\delta = \Sigma(m_i \delta_i) \quad (2),$$

wherein $m_i$ represents a mole fraction of the monomer i which constitutes the polymer and $\delta_i$ represents a solubility parameter of the monomer i.

(3) Viscosity

Viscosity of dispersion agent 1 which will be mentioned later was measured at 25° C. by use of a Brookfield viscometer (B type viscometer) (R100 viscometer (RB type), manufactured by Tokimec Inc.).

(4) Molecular Weight

Molecular weight was measured using a gel permeation chromatography (GPC) (trade name HLC-8120, manufactured by Tosoh Corporation). As the column, TSK gel G 5,000HXL*GMHXL-L (manufactured by Tosoh Corporation) was used. The calibration curve was obtained using F288/F80/F40/F10/F4/F1/A5000/A1000/A500 (standard polystyrenes, manufactured by Tosoh Corporation) and styrene monomer.

A tetrahydrofuran (THF) solution in which 0.4% by mass of a polymer was dissolved was prepared, and the molecular weight of the polymer was measured at 40° C. using 100 μl of the resulting THF solution. A mass average molecular weight (Mw), number average molecular weight (Mn), and the mass average molecular weight versus number average molecular weight (Mw/Mn) were calculated based on the standard polystyrenes.

(5) Anti-Blocking Property

To a cylindrical container having an inside diameter of 54 mm, about 5 g of a powder coating material or a thermal fluidity modifier was introduced, a cylindrical balance weight having an outside diameter of 52.5 mm and a mass of 1 kg was placed thereon, and the resulting system was kept at 40° C. for 2 weeks. Then the blocking state of the powder coating material or the thermal fluidity modifier was inspected by visual observation and finger touch and evaluated in accordance with the following standard.

◎: There is no block in both of the powder coating material and the thermal fluidity modifier ○: Although there is a block in the thermal fluidity modifier, it is easily loosened.

Δ: Although there is a block in the powder coating material, it is easily loosened.

x: There is a block in the powder coating material, which cannot be loosened.

(6) Thermal Fluidity

About 3 g of the powder coating material was precisely weighed and made into a tablet sample using a tabletting machine. The resulting tablet sample was placed on a steel plate set at an angle of 45 degrees against the horizontal plane and kept in an oven at a temperature of 130° C. for 15 minutes. The steel plate was taken out of the oven and the flowed length of the sample was measured and evaluated in accordance with the following standard.

⊚: 80 mm or longer.
○: 75 mm or longer and less than 80 mm.
Δ: Less than 75 mm.

(7) Appearance of a Coating Film

Visual inspection was carried out on the surface of a coating film of a coating film test plate and the result was evaluated in accordance with the following standard.

○: There is no abnormality in the generation of crawling and in the leveling property.
Δ: There is slight abnormality either in the generation of crawling or in the leveling property.
x: There is remarkable abnormality either in the generation of crawling or in the leveling property.

(8) Gloss

Relative-specular glossiness of a coating film at an incidence angle of 60° and 20° were measured with a gloss meter (VG-2000, manufactured by Nippon Denshoku Industries Co., Ltd.) and the results were evaluated in accordance with the following standard.

<60° Relative Specular Glossiness>
⊚: 95.0 or higher
○: 90.0 or higher and less than 95.0
Δ: 80.0 or higher and less than 90.0
x: Less than 80.0

<20° Relative Specular Glossiness>
⊚: 80.0 or higher
○: 70.0 or higher and less than 80.0
Δ: 50.0 or higher and less than 70.0
x: Less than 50.0

(9) Compatibility

A coating film test plate was prepared using a sample in which 99 parts by mass of a powder coating material obtained in each of examples 1 to 16 and comparative examples 1 to 3 and 1 part by mass of a powder coating material containing a thermal fluidity modifier including a low glass transition temperature-acrylic polymer for general-purposes were mixed. The appearance and gloss of the coating film test plate thus obtained were evaluated in the same manner as in the above (7) and (8), respectively.

Note that a powder coating material obtained in comparative example 4 which will be mentioned later was used as the powder coating material containing a thermal fluidity modifier including a low glass transition temperature-acrylic polymer for general-purposes.

<Dispersing Agent>

To a polymerization apparatus equipped with a stirrer, a condenser, and a thermometer, 900 parts of deionized water, 60 parts of sodium 2-sulfoethyl methacrylate, 10 parts of potassium metacrylate, and 12 parts of methyl methacrylate were added and stirred. The polymerization temperature was raised to 50° C. while the inside of the polymerization apparatus was purged with nitrogen, and 0.08 part of 2,2'-azobis (2-methylpropionamidine)dihydrochloride as a polymerization initiator was added to the reaction system, and the polymerization temperature was further raised to 60° C. Methyl methacrylate was dropped into to the reaction system at a rate of 0.24 part per minute continuously for 75 minutes using a drop pump at the same time of the addition of the polymerization initiator. The polymerization temperature was kept at 60° C. for 6 hours, then cooled to room temperature, and dispersing agent 1 was obtained as a transparent aqueous polymer solution. The solid content of the dispersing agent 1 was 10%, and the viscosity was 950 mPa·s.

<Thermal Fluidity Modifier 1>

To a polymerization apparatus equipped with a stirrer, a condenser, and a thermometer, 200 parts of deionized water, 0.3 part of sodium sulfate, and 0.4 part of the dispersing agent 1 (solid content thereof being 10%) were added and stirred to obtain a homogeneous aqueous solution. Then 30 parts of t-butyl methacrylate, 45 parts of i-butyl methacrylate, 25 parts of isobornyl methacrylate, 3 parts of 2-ethylhexyl thioglycolate, 0.5 part of 2,2'-azobis(2,4-dimethylvaleronitrile), and 0.05 part of 2,2'-azobis(2-methylbutylonitrile) were added thereto to obtain an aqueous suspension. Subsequently, the inside of the polymerization apparatus was purged with nitrogen, the polymerization temperature was raised to 70° C. and the reaction was allowed to proceed for 1 hour. Then the temperature was raised to 85° C. and kept at the same temperature for 1 hour for post treatment so as to further increase the conversion, and then cooled to 40° C. to obtain an aqueous suspension containing a particulate polymer. The aqueous suspension was filtrated with a nylon filter cloth having an opening of 45 μm, and the filter cake was washed with deionized water, dehydrated, and dried at 40° C. for 16 hours to obtain thermal fluidity modifier 1. The mass average molecular weight (Mw) of the thermal fluidity modifier 1 was 12,000, and the mass average molecular weight versus number average molecular weight (Mw/Mn) was 1.85. The results are shown in Table 1.

<Thermal Fluidity Modifiers 2 to 19>

The same procedure as described in the thermal fluidity modifier 1 was carried out except that monomers, a chain transfer agent, a polymerization initiator, and a dispersing agent shown in Table 1 or 2 were used and a polymerization temperature and a temperature for post treatment were set as shown in Table 1 or 2 to obtain each of the thermal fluidity modifiers 2 to 19. The results are shown in Tables 1 and 2.

TABLE 1

| | | Thermal fluidity modifier | | | | | | | | | |
|---|---|---|---|---|---|---|---|---|---|---|---|
| | | 1 | 2 | 3 | 4 | 5 | 6 | 7 | 8 | 9 | 10 |
| Monomer (part by mass) | t-BMA | 30 | 55 | 15 | 5 | 60 | 65 | 70 | 75 | 75 | 75 |
| | i-BMA | 45 | 45 | 85 | 95 | 20 | — | — | — | — | — |
| | EHA | — | — | — | — | — | — | — | — | — | — |
| | LMA | — | — | — | — | 20 | 35 | 30 | 25 | 25 | 25 |
| | IBXMA | 25 | — | — | — | — | — | — | — | — | — |
| | St | — | — | — | — | — | — | — | — | — | — |
| Chain transfer agent (part by mass) | OTG | 3 | 3 | 3 | 3 | 3 | 3 | 3 | 6 | 3 | 1 |
| | MSD | — | — | — | — | — | — | — | — | — | — |
| Polymerization initiator (part by mass) | ADVN | 0.5 | 0.5 | 0.2 | 0.2 | 0.3 | 0.2 | 0.2 | 0.25 | 0.3 | 0.25 |
| | AMBN | 0.05 | 0.05 | 0.05 | 0.05 | 0.05 | 0.05 | 0.05 | 0.02 | 0.05 | 0.02 |

TABLE 1-continued

|  |  | Thermal fluidity modifier | | | | | | | | | |
|---|---|---|---|---|---|---|---|---|---|---|---|
|  |  | 1 | 2 | 3 | 4 | 5 | 6 | 7 | 8 | 9 | 10 |
|  | LPO | — | — | — | — | — | — | — | — | — | — |
|  | BPO | — | — | — | — | — | — | — | — | — | — |
| Dispersing agent (part by mass) | Dispersing agent 1 | 0.4 | 0.4 | 0.4 | 0.4 | 0.4 | 0.25 | 0.25 | 0.5 | 0.4 | 0.5 |
| Polymerization temperature (° C.) | | 70 | 70 | 70 | 70 | 70 | 70 | 70 | 70 | 70 | 70 |
| Post treatment temperature (° C.) | | 85 | 85 | 85 | 85 | 85 | 90 | 90 | 90 | 85 | 90 |
| Tg (° C.) | | 89.2 | 80.6 | 60.1 | 55.3 | 44.1 | 21.7 | 31.5 | 41.9 | 41.9 | 41.9 |
| δ (J/cm³)^(1/2) | | 18.81 | 18.74 | 18.90 | 18.94 | 18.64 | 18.54 | 18.55 | 18.55 | 18.55 | 18.55 |
| Mw | | 12,000 | 11,600 | 11,200 | 11,400 | 11,500 | 12,100 | 11,900 | 6,700 | 12,400 | 33,400 |
| Mw/Mn | | 1.85 | 1.87 | 2.00 | 1.90 | 2.22 | 1.87 | 1.89 | 1.83 | 2.12 | 1.99 |

TABLE 2

|  |  | Thermal fluidity modifier | | | | | | | | |
|---|---|---|---|---|---|---|---|---|---|---|
|  |  | 11 | 12 | 13 | 14 | 15 | 16 | 17 | 18 | 19 |
| Monomer (part by mass) | t-BMA | 75 | 100 | 80 | 86 | 56 | 26 | — | 60 | 60 |
|  | i-BMA | — | — | — | — | — | — | — | — | — |
|  | EHA | — | — | — | 14 | 14 | 14 | 25 | — | — |
|  | LMA | 25 | — | — | — | — | — | — | 40 | — |
|  | IBXMA | — | — | 20 | — | — | — | 75 | — | 40 |
|  | St | — | — | — | — | 30 | 60 | — | — | — |
| Chain transfer agent (part by mass) | OTG | 0.5 | 3 | 3 | 3 | — | — | 3 | 3 | 3 |
|  | MSD | — | — | — | — | 1.9 | 1.9 | — | — | — |
| Polymerization initiator (part by mass) | ADVN | 0.25 | 0.2 | 0.25 | — | — | — | — | 0.25 | 0.25 |
|  | AMBN | 0.02 | 0.05 | 0.02 | — | — | — | — | 0.02 | 0.02 |
|  | LPO | — | — | — | 1.9 | — | — | 1.9 | — | — |
|  | BPO | — | — | — | — | 5.25 | 5.25 | — | — | — |
| Dispersing agent (part by mass) | Dispersing agent 1 | 0.5 | 0.25 | 0.5 | 0.8 | 0.4 | 0.4 | 0.8 | 0.5 | 0.5 |
| Polymerization temperature (° C.) | | 70 | 70 | 70 | 70 | 85 | 85 | 70 | 70 | 70 |
| Post treatment temperature (° C.) | | 90 | 90 | 90 | 85 | 90 | 90 | 85 | 90 | 90 |
| Tg (° C.) | | 41.9 | 107.0 | 114.9 | 72.9 | 71.1 | 69.4 | 72.5 | 12.5 | 123.1 |
| δ (J/cm³)^(1/2) | | 18.55 | 18.57 | 18.61 | 18.60 | 19.75 | 20.68 | 18.87 | 18.54 | 18.66 |
| Mw | | 56,500 | 12,700 | 11,400 | 14,500 | 19,300 | 16,000 | 9,500 | 12,000 | 10,300 |
| Mw/Mn | | 2.08 | 2.04 | 1.94 | 2.30 | 2.15 | 2.33 | 1.82 | 1.87 | 1.88 |

In these tables, the abbreviations are as follows:
t-BMA: t-Butyl methacrylate
i-BMA: i-Butyl methacrylate
EHA: 2-Ethylhexyl methacrylate
LMA: Lauryl methacrylate
IBXMA: Isobornyl methacrylate
St: Styrene
OTG: 2-Ethylhexyl thioglycolate
MSD: α-Methylstyrene dimer
ADVN: 2,2'-Azobis(2,4-dimethylvaleronitrile)
AMBN: 2,2'-Azobis(2-methylbutylonitrile)
LPO: Lauroyl peroxide
BPO: Benzoyl peroxide Example 1

Binder resin: 91.6 parts (SP-011, manufactured by Sun Polymers International Inc.; polyester resin)
Curing agent: 6.9 parts (triglycidyl isocyanurate)
Thermal fluidity modifier: 1.5 parts (thermal fluidity modifier 1)
Anti-foaming agent: 0.57 part (benzoin)
Pigment: 43.1 parts (CR-826, manufactured by Kerr-McGee Corporation; titanium oxide)

The above items were preliminarily mixed and then melt-kneaded at 100° C. with a twin screw extruder (ZSK-30, manufactured by Werner & Pfeidlerer). After being cooled, the melt-kneaded matter thus obtained was crushed with a crusher (Brinkman. 010") and classified with a 170 mesh sieve to obtain a powder coating material. The powder coating material was coated on a steel plate by electrostatic powder coating in such a way that thickness of the coating film after dried would become 50 μm, and baked at 190° C. for 15 minutes to obtain a cured coating film. The physical properties of the powder coating material and the cured coating film thus obtained were measured and evaluated. The evaluation results are shown in Table 3.

Examples 2 to 16 and Comparative Examples 1 to 4

The same procedure as in Example 1 was carried out except that the thermal fluidity modifier shown in Table 3 or 4 was used and thereby each powder coating material and the cured coating film thereof were obtained. The evaluation results are shown in Tables 3 and 4.

Note that, as thermal fluidity modifier 20 used in Comparative Example 4, a thermal fluidity modifier on the market (Resiflow P-67, manufactured by Estron Chemical Inc.) was used, in which a low glass transition temperature-acrylic polymer, which does not contain t-butyl(meth)acrylate units, has a glass transition temperature of 0° C. or below, and is liquid at room temperature, is adsorbed on fine silica particles.

TABLE 3

| | | Example | | | | | | | | | |
|---|---|---|---|---|---|---|---|---|---|---|---|
| | | 1 | 2 | 3 | 4 | 5 | 6 | 7 | 8 | 9 | 10 |
| Thermal fluidity modifier | | 1 | 2 | 3 | 4 | 5 | 6 | 7 | 8 | 9 | 10 |
| Anti-blocking property | | ⊚ | ⊚ | ⊚ | ⊚ | ⊚ | △ | ○ | ⊚ | ⊚ | ⊚ |
| Thermal fluidity | | ○ | ⊚ | ⊚ | ⊚ | ⊚ | ⊚ | ⊚ | ⊚ | ⊚ | ⊚ |
| Baking condition/ 190° C. × 15 min | Appearance | ○ | ○ | ○ | △ | ○ | ○ | ○ | ○ | ○ | ○ |
| | 60° relative specular glossiness | ○ | ⊚ | ⊚ | ○ | ⊚ | ⊚ | ⊚ | ⊚ | ⊚ | ○ |
| | 20° relative specular glossiness | ○ | ⊚ | ⊚ | ⊚ | ⊚ | ⊚ | ⊚ | ⊚ | ⊚ | ⊚ |
| Compatibility | Appearance | △ | ○ | ○ | △ | ○ | ○ | ○ | ○ | ○ | ○ |
| | 60° relative specular glossiness | △ | ○ | ○ | ○ | ⊚ | ⊚ | ⊚ | ⊚ | ⊚ | ○ |
| | 20° relative specular glossiness | △ | ⊚ | ○ | ○ | ⊚ | ⊚ | ⊚ | ⊚ | ⊚ | ○ |

TABLE 4

| | | Example | | | | | | Comparative Example | | | |
|---|---|---|---|---|---|---|---|---|---|---|---|
| | | 11 | 12 | 13 | 14 | 15 | 16 | 1 | 2 | 3 | 4 |
| Thermal fluidity modifier | | 11 | 12 | 13 | 14 | 15 | 16 | 17 | 18 | 19 | 20 |
| Anti-blocking property | | ⊚ | ⊚ | ⊚ | ⊚ | ⊚ | ⊚ | ⊚ | X | ⊚ | X |
| Thermal fluidity | | ⊚ | ⊚ | ○ | ⊚ | ⊚ | ⊚ | ○ | ⊚ | ○ | ○ |
| Baking condition/ 190° C. × 15 min | Appearance | △ | ○ | △ | ○ | △ | △ | X | ○ | X | ○ |
| | 60° relative specular glossiness | ○ | △ | △ | ○ | ○ | ⊚ | ○ | ⊚ | △ | ○ |
| | 20° relative specular glossiness | ○ | △ | △ | ○ | ⊚ | ○ | ○ | ⊚ | △ | ⊚ |
| Compatibility | Appearance | △ | △ | △ | ○ | △ | △ | X | ○ | X | — |
| | 60° relative specular glossiness | ○ | △ | △ | ○ | △ | △ | X | ⊚ | △ | — |
| | 20° relative specular glossiness | ○ | △ | △ | ○ | △ | △ | X | ⊚ | △ | — |

Examples 17 to 19 and Comparative Example 5

The same procedure as in Example 1 was carried out except that the thermal fluidity modifier and the baking condition shown in Table 5 were used and thereby each powder coating material and the cured coating film thereof were obtained. The evaluation results are shown in Table 5.

TABLE 5

| | | Example | | | Comp. Ex. |
|---|---|---|---|---|---|
| | | 17 | 18 | 19 | 5 |
| Thermal fluidity modifier | | 2 | 3 | 9 | 20 |
| Baking condition/ 180° C. × 15 min | Appearance | ○ | ○ | ○ | ○ |
| | 60° relative specular glossiness | ⊚ | ⊚ | ⊚ | ○ |
| | 20° relative specular glossiness | ⊚ | ⊚ | ⊚ | ⊚ |
| Baking condition/ 170° C. × 15 min | Appearance | ○ | ○ | ○ | ○ |
| | 60° relative specular glossiness | ⊚ | ○ | ⊚ | X |
| | 20° relative specular glossiness | ⊚ | ○ | ⊚ | △ |
| Baking condition/ 160° C. × 15 min | Appearance | ○ | ○ | ○ | ○ |
| | 60° relative specular glossiness | ⊚ | △ | ⊚ | X |
| | 20° relative specular glossiness | ⊚ | ○ | ⊚ | △ |

Example 20

Binder resin: 93.6 parts (SP-011, manufactured by Sun Polymers International Inc.; polyester resin)
Curing agent: 4.9 parts (PRIMID XL-552, manufactured by EMS-Chemie Holding AG; β-hydroxyalkylamide)
Thermal fluidity modifier: 1.5 parts (thermal fluidity modifier 1)
Anti-foaming agent: 0.57 part (benzoin)
Pigment: 43.1 parts (CR-826, manufactured by Kerr-McGee Corporation; titanium oxide)

The same procedure as in Example 1 was carried out except that the above items were used and thereby the powder coating material and the cured coating film thereof were obtained. The evaluation results are shown in Table 6.

Comparative Example 6

The same procedure as in Example 20 was carried out except that thermal fluidity modifier 20 was used as the thermal fluidity modifier and thereby the powder coating material and the cured coating film thereof were obtained. The evaluation results are shown in Table 6.

TABLE 6

|  |  | Example 20 | Comp. Ex. 6 |
|---|---|---|---|
|  | Thermal fluidity modifier | 1 | 20 |
|  | Anti-blocking property | ⊚ | X |
|  | Thermal fluidity | ⊚ | ○ |
| Baking condition/ | Appearance | ○ | ○ |
| 190° C. × 15 min | 60° relative specular glossiness | ○ | ○ |
|  | 20° relative specular glossiness | ○ | ○ |

As shown in Tables 3 and 4, there were not observed any remarkable defects in the anti-blocking property, thermal fluidity, coating film appearance, gloss, and compatibility of the powder coating materials obtained in Examples 1 to 16.

In addition, the powder coating materials obtained in Examples 15 and 16 tended to have slightly low coating film appearance and compatibility because the solubility parameters (δ) of thermal fluidity modifiers 15 and 16 were larger than 19.00 $(J/cm^3)^{1/2}$, but the anti-blocking property and thermal fluidity of the powder coating materials, and the gloss of the coating films were good.

Further, as shown in Table 5, the powder coating materials obtained in Examples 17 and 19 had remarkably good gloss of the coating film even under the condition of a low baking temperature of 170° C. or below because the solubility parameters (δ) of thermal fluidity modifiers 2 and 9 were smaller than 18.80 $(J/cm^3)^{1/2}$.

By contrast, as shown in Table 4, thermal fluidity modifier 17 used in Comparative Example 1 did not contain t-butyl (meth)acrylate units and hence a cured coating film to be formed from the powder coating material obtained from the thermal fluidity modifier 17 had insufficient coating film appearance and compatibility.

In addition, thermal fluidity modifier 18 used in Comparative Example 2 had a glass transition temperature (Tg) lower than 20° C. and hence the powder coating material obtained therefrom had an anti-blocking property considerably inferior to those in Examples.

In addition, thermal fluidity modifier 19 used in Comparative Example 3 had a glass transition temperature (Tg) of higher than 120° C. and hence the powder coating material obtained therefrom had a coating film appearance and compatibility inferior to those in Examples.

In addition, thermal fluidity modifier 20 used in Comparative Example 4 is the one in which a low glass transition temperature-acrylic polymer, which is liquid at room temperature, is adsorbed on fine silica particles, and hence the powder coating material obtained therefrom had an insufficient anti-blocking property. In addition, as shown in Comparative Example 5 in Table 5, the powder coating material obtained from the thermal fluidity modifier 20 gave considerably inferior gloss of the coating film to those in Examples under the condition of a low baking temperature of 170° C. or below. Further, as shown in Comparative Example 6 in Table 6, the powder coating material obtained from the thermal fluidity modifier 20 had an anti-blocking property considerably inferior to those in Examples even in the case where the curing agent was changed to β-hydroxyalkylamide.

INDUSTRIAL APPLICABILITY

It is possible to provide a powder coating material excellent in anti-blocking property and thermal fluidity at the time of thermal curing by using the thermal fluidity modifier of the present invention. In addition, the powder coating material thus obtained by use of the thermal fluidity modifier can form a cured coating film excellent in coating film appearance and gloss and is extremely industrially useful.

The invention claimed is:

1. A powder coating material comprising:
a thermal fluidity modifier for a powder coating material, a binder resin, and
a curing agent, wherein
the thermal fluidity modifier for a powder coating material comprising a polymer comprising t-butyl(meth)acrylate units and having a glass transition temperature (Tg) of 20 to 120° C. as calculated by the following equation (1):

$$1/Tg = \Sigma(w_i/Tg_i) \qquad (1),$$

wherein $w_i$ represents a mass fraction of monomer i which constitutes the polymer and $Tg_i$ represents a glass transition temperature of a homopolymer of the monomer i, wherein
an amount of the t-butyl(meth)acrylate units is in the range of from 55 to 75 parts by mass in 100 parts by mass of a total monomer units, based on a monomer charge composition, and
a solubility parameter (δ) of the polymer as calculated by the following equation (2) is 18.55 to 18.80 $(J/cm^3)^{1/2}$, $$\delta = \Sigma(m_i \delta_i) \qquad (2),$$

wherein $m_i$ represents a mole fraction of the monomer i which constitutes the polymer and $\delta_i$ represents a solubility parameter of the monomer i.

2. The powder coating material according to claim 1, wherein a mass average molecular weight (Mw) of the thermal fluidity modifier for the powder coating material is 5,000 to 50,000.

3. The powder coating material according to claim 1, wherein an amount of the thermal fluidity modifier in the powder coating material is in the range of from 0.1 to 5 parts by mass in 100 parts by mass of a total of the binder resin, curing agent, and thermal fluidity modifier.

4. The powder coating material according to claim 2, wherein an amount of the thermal fluidity modifier in the powder coating material is in the range of from 0.1 to 5 parts by mass in 100 parts by mass of a total of the binder resin, curing agent, and thermal fluidity modifier.

5. The powder coating material according to claim 1, wherein the polymer comprising t-butyl(meth)acrylate units also comprises i-butyl(meth)acrylate units.

6. The powder coating material according to claim 2, wherein the polymer comprising t-butyl(meth)acrylate units also comprises i-butyl(meth)acrylate units.

7. The powder coating material according to claim 3, wherein the polymer comprising t-butyl(meth)acrylate units also comprises i-butyl(meth)acrylate units.

8. The powder coating material according to claim 4, wherein the polymer comprising t-butyl(meth)acrylate units also comprises i-butyl(meth)acrylate units.

9. The powder coating material according to claim 1, wherein the polymer comprising t-butyl(meth)acrylate units also comprises lauryl methacrylate units.

10. The powder coating material according to claim 2, wherein the polymer comprising t-butyl(meth)acrylate units also comprises lauryl methacrylate units.

11. The powder coating material according to claim 3, wherein the polymer comprising t-butyl(meth)acrylate units also comprises lauryl methacrylate units.

12. The powder coating material according to claim 4, wherein the polymer comprising t-butyl(meth)acrylate units also comprises lauryl methacrylate units.

* * * * *